Patented Mar. 29, 1938

2,112,298

UNITED STATES PATENT OFFICE 2,112,298

METALLURGICAL CYANIDE PROCESS

Louis D. Mills and Thomas B. Crowe, Palo Alto, and Joye C. Haun, San Francisco, Calif., assignors to The Merrill Company, San Francisco, Calif., a corporation of California No Drawing. Application March 27, 1935, Serial No. 13,279

12 Claims. (Cl. 75—107)

This invention relates generally to processes making use of cyanide solution for the recovery of gold, silver, and other metals, where the metals are dissolved as cyanides and subsequently precipitated from the solution.

It is an object of the invention to provide a novel process of the above character, wherein precipitation of various cyanide solutions by zinc or a like reagent is made possible or is made more efficient and effective. A further object is to provide a process having particular application where ordinary processes of precipitating cyanide solution are inoperative or not effective because of a low concentration of cyanide in the solution. In attaining such objects the invention is characterized by the presence of a solvent or solvents tending to promote precipitation, while an optimum hydrogen ion concentration is afforded.

A further object of the invention is to provide a complete cyanide process for the economical recovery of gold from low-grade gold-bearing deposits.

It is customary to precipitate metals from cyanide solution by contacting the solution with a precipitating agent such as zinc, either by flowing the solution through zinc shavings or by introducing zinc dust and depositing the precipitated metals upon elements of a precipitating filter through which the solution is caused to flow. Where the solution contains sufficient simple cyanide, such precipitation is usually effective, particularly if the solution has previously been mechanically deaerated. However, where the solution is relatively weak in simple cyanide, the precipitating action may be very slow and incomplete, or may be comparatively inoperative, due to the low solvent power of the weak cyanide solution upon the zinc precipitant, and due to the formation of deleterious by-products such as basic zinc compounds. Such compounds, being substantially insoluble in relatively weak alkaline cyanide solutions, give serious difficulty, in that they form insulating coatings about the zinc particles to retard precipitation, and also tend to clog zinc shavings or filter elements through which the solution may be passed during precipitation. The presence of appreciable amounts of alkali in the cyanide solution is of no practical benefit under such conditions, and may even retard rather than accelerate precipitation, because the formation of such deleterious basic zinc compounds tends to increase with an increase in alkali concentration. Thus there has been no practical procedure for the effective commercial precipitation of weak solutions of cyanide containing, for instance, less than 0.003% of sodium cyanide, other than strengthening the solution by the addition of more cyanide, which is generally an expensive expedient. Attempts to precipitate such solutions while strongly acid, by zinc, have failed commercially, due to rapid and wasteful dissolution of the zinc without proper contact with the metal cyanides to be precipitated.

In reducing to practice the present invention, it has been discovered that when a cyanide solution is caused to afford a hydrogen ion concentration within a relatively narrow range, which range, according to our observations, may be a pH value from 6 to 8.4 (as expressed in Sorensen's units), precipitation of the desired gold or like metals by zinc is rapid and complete, irrespective of the amount of simple cyanide present, provided there is present a suitable solvent for the zinc. Cyanide solutions such as are now effectively precipitated by known methods vary in pH value, but in many typical instances may be determined to be between pH 8.4 and 12. Dilute cyanide solutions, which might be available for precipitation if proper methods were known, vary widely in hydrogen ion concentration, but typical examples may range from pH 7 to 12. If a relatively dilute cyanide solution should be caused to have a pH value falling within the range of from 6 to 8.4, through circumstances having no particular bearing upon the present process, gold or silver could not be effectively precipitated by zinc without further treatment of the solution, due to the absence of a proper solvent for the zinc. Thus, conditioning of the cyanide solution in accordance with the present process involves a neutralizing step, where the pH value of the solution before treatment is substantially outside the range of from 6 to 8.4, while in the treatment of a solution which happens to be near neutral point, little if any neutralization may be practised, although the solution will require conditioning to satisfy other requirements for effective precipitation.

Several different reagents are available in carrying out the present process. The use of certain specified reagents will for convenience be described under separate headings, identified as Procedures A, B, C and D.

Procedure A

To the solution to be precipitated is added a suitable alkali bisulphite, such as sodium bisulphite or calcium bisulphite. In the event the solution has a pH value in excess of 8.4 (which is usually the case because of the presence of protective alkali), the first addition of alkali bisulphite serves to neutralize alkalinity of the solution and to bring the solution between pH values of from 6 to 8.4. In addition to the amount of alkali bisulphite employed to neutralize alkalinity, a slight excess is provided, so that alkali bisulphite is afforded in free solution during precipitation. An economy in the use of alkali bisulphite can be practiced by first adding an acid, such as sulphuric acid, to effect neutralization, after which alkali bisulphite is added. Sulphurous acid can be employed as a neutralizer, in which event the reaction between the sulphurous acid and the alkali earth and/or alkali metal ion will of itself form bisulphites, such as calcium and/or sodium bisulphite, in the solution. Where the solution to be conditioned is at or near the neutral point, it is evident that little, if any, reagent need be employed as a neutralizer, it being necessary only to provide a slight amount of alkali bisulphite in free solution.

The solution, after being conditioned as described above, is then contacted with zinc or a like metallic precipitant, to effect precipitation of metals, either by passing the solution through zinc boxes or by the preferable method of introducing zinc dust into the solution and causing the solution to flow through elements of a precipitating filter upon which the desired metals are recovered. Precipitation of the metals proceeds rapidly to completion without precipitation of metal cyanides or release of hydrocyanic acid gas from the solution, and is economical with respect to consumption of zinc.

Sodium and calcium bisulphites are solvents for zinc and when present during precipitation as described above, no substantially insoluble by-products of precipitation are formed. The substantially neutral condition of the solution inhibits or minimizes formation of deleterious basic zinc compounds such as have given difficulty in the past. Such bisulphites of themselves in dilute solution afford a pH value of from 6.5 to 6.7. When such salts are present in free solution in neutralized cyanide solution, the combined solution maintains a pH value between the range of from 6 to 8.4, the particular value being dependent upon the particular properties of the cyanide solution being treated.

The alkali bisulphite in the solution during precipitation acts as a buffer salt, tending to keep the hydrogen ion concentration substantially constant. Likewise it serves to dissolve the zinc at a proper rate to effect complete precipitation, without, however, causing dissolution of zinc at such a rapid rate as to cause wastage of the precipitant. Because of absence of troublesome insoluble by-products detrimental to precipitation, the zinc is maintained in clean and active condition. Because of its deoxidizing action, a further action of the bisulphite is to remove dissolved oxygen which may be present in the solution. Removal of oxygen is necessary for the complete precipitation of precious metals, such as gold and silver.

Procedure B

The process in this instance is similar to Procedure A, except that the solution is conditioned by the use of sulphur dioxide gas. Upon passing this gas through a cyanide solution containing alkali earth or alkali metal ion, bisulphites such as calcium and/or sodium bisulphite are formed in free solution, after the alkali has been neutralized. Care should be taken to avoid passing the sulphur dioxide gas through the solution for too long a period after the solution has been substantially neutralized, as otherwise the solution will become too strongly acid. It is apparent that this procedure can, if desired, be combined with certain phases of Procedure A, as for example by passing sulphur dioxide gas through the solution to effect partial neutralization, followed by the addition of a small amount of alkali bisulphite. Treatment according to this procedure also serves to remove any dissolved oxygen, by virtue of a deoxidizing action.

Procedure C

In both Procedure A and Procedure B the solution is conditioned by providing a suitable buffer salt in free solution, which provides all the requisites for efficient precipitation by zinc and which serves to maintain the hydrogen ion concentration substantially constant between a pH range of from 6 to 8.4. In the procedure now to be described, carbon dioxide gas is utilized as a reagent, and the hydrogen ion concentration is maintained during the precipitation by the combined effects of carbonic acid, and calcium and/or sodium bicarbonate. The procedure may be relatively simple, involving merely the passing of carbon dioxide gas through the solution. Assuming that the solution initially has a hydrogen ion concentration considerably above pH 8.4, the carbon dioxide causes the solution to be neutralized to a pH value between the range of from 6 to 8.4. Initially, in a solution containing calcium ion, a white precipitate of calcium carbonate is formed, after which the solution clarifies, due to conversion of substantially insoluble calcium carbonate to soluble calcium bicarbonate. When the solution has been substantially neutralized, it contains carbonic acid, as well as calcium bicarbonate in free solution. Assuming that gold or silver is being removed, precipitation by zinc is now carried out in the manner previously described. As is also the case with Procedures A and B, precipitation of metals tends to increase alkalinity of the solution. In Procedures A and B this tendency is offset by reaction with bisulphite in free solution, while in Procedure C it is offset by reaction with carbonic acid. Therefore, if warranted by the amount of metals being precipitated, the carbonic acid can be replenished or maintained during precipitation by further contact with carbon dioxide.

In some cases the use of carbon dioxide gas for carrying out the process may be desirable, because it dispenses with the use of more expensive chemicals. Likewise, such a gas can be passed through the solution indefinitely without causing the hydrogen ion concentration to be carried beyond the desired value.

As previously stated, in precipitating gold or silver the solution during precipitation should be substantially free of dissolved oxygen. Thus, in some instances dissolved oxygen can be removed by mechanical deaeration or by the use of a suitable reducing agent, such as sodium or calcium bisulphite, after which the solution can be conditioned by the use of carbon dioxide gas relatively free of oxygen. An alternative treatment is to employ an impure source of carbon dioxide gas to neutralize the solution, and to add an alkali bisulphite in accordance with Procedure A to enable complete and rapid precipitation. A further alternative is to provide a suitable amount of sulphur dioxide gas in conjunction with the carbon dioxide, which will serve to offset the presence of oxygen by its reducing action, thus placing the solution in proper condition for precipitation. A suitable source of carbon dioxide is flue gas, which is usually low in oxygen content and which generally contains sulphur dioxide.

Where the process is being carried out chiefly for the purpose of precipitating copper, the presence of small amounts of oxygen is not seriously detrimental. However, copper is precipitated more effectively if substantially all the oxygen is removed.

In the above-described procedure utilizing carbon dioxide gas, the calcium bicarbonate likewise serves as a buffer medium. This will be evident when it is noted that a saturated solution of carbonic acid of itself has a pH value of about 3.8, but in a solution conditioned as explained above the pH value of the solution is altered by the presence of calcium bicarbonate, to a value within the range of from 6 to 8.4, even in the absence of an alkali bisulphite.

Assuming that no alkali bisulphite is added or provided in the treatment outlined, the requisite solvent for the zinc is afforded by the carbonic acid, and no detrimental by-products, such as might tend to form insulating coatings about the zinc particles, will be formed during precipitation.

*Procedure D*

The reagent utilized in this instance is ferrous sulphate. It can be utilized in substantially the same manner as the alkali bisulphite described in Procedure A. When added to a solution containing considerable quantities of alkali, it will neutralize alkalinity to afford a pH value between the range of from 6 to 8.4. With the addition of a slight excess, a solvent action is afforded for the zinc, and precipitation will proceed to completion with the hydrogen ion concentration being maintained substantially constant. For precipitating gold or silver, the use of ferrous sulphate as a buffer salt during precipitation by zinc does not appear to be as feasible as the use of the other reagents specified in connection with Procedures A, B and C, mainly because gelatinous by-products tend to form, which tend to clog filter elements when precipitation with zinc dust is employed, and which also tend to clog zinc shavings. However, one distinct advantage is afforded in that the cyanide is converted to iron cyanides during precipitation, and therefore the solution is rendered non-poisonous. Thus, in the treatment of dilute solutions where it may not be economical to attempt re-use of the solution after precipitation, the innocuous solution can be discarded without causing stream pollution. The ferrous sulphate likewise acts as a buffer medium in maintaining the desired hydrogen ion concentration during precipitation, in addition to affording a solvent for the zinc. It also functions as a deoxidizer, substantially the same as an alkali bisulphite.

In connection with the precipitation of copper from a conditioned solution, it should be explained that in the procedures outlined, when followed primarily for the precipitation of gold and/or silver, copper is also precipitated, although the process tends to be preferential to the precious metals. In precipitating gold or silver, careful observations indicate that it is necessary for complete precipitation to maintain the hydrogen ion concentration of the solution substantially constant at a value within the range specified, throughout or for the major part of the precipitating operation. However, such practice may not be followed in precipitating copper alone, particularly since complete precipitation of this metal is generally not required.

In the foregoing, various procedures have been described for treating cyanide solutions to obtain efficient precipitation. It may not be desirable to utilize such procedures where the solution contains a sufficient amount of cyanide to obtain efficient precipitation by known methods. However, in many cyanide installations, dilute cyanide solutions containing appreciable amounts of valuable metals are available, which at present can be precipitated only by adding increased amounts of cyanide. The procedures specified can be applied to such dilute solutions to effect substantially complete precipitation, without undue expense and without the necessity of increasing the cyanide content.

There are also available in many localities ores or discarded tailings relatively low in gold value, which are unprofitable to work by known recovery methods. As an elaborated phase of the present invention, a complete process is provided enabling an economic recovery of gold from such ores or deposits. This elaborated process can be outlined briefly as follows:—A low-grade ore or gold-bearing material, containing gold in such form that it is readily amenable to dissolution by cyanide, is contacted with a cyanide solution containing only a sufficient amount of cyanide to adequately dissolve the gold, but when pregnant having an insufficient amount of simple cyanide to enable precipitation by contact with zinc in accordance with known methods. The dilute pregnant solution thus obtained is then conditioned in accordance with one of the procedures previously outlined which is applicable for treatment of gold-bearing solutions, and the solution precipitated by zinc dust, by passing the solution through zinc boxes or by some other suitable metallic precipitant. To point out the commercial significance of this process, it should be explained that in many cyanide installations the amount of cyanide employed in the solution is dependent upon precipitation requirements and not upon the cyanide concentration required for dissolving the gold. However, when carrying out precipitation in accordance with the procedures outlined herein, only sufficient cyanide need be employed to effect dissolution of gold from the ore, since simple cyanide in the solution at the time of precipitation is no longer a limiting requirement. With many ores, gold can be effectively dissolved by solutions titrating less than 0.001% potassium cyanide, as compared with 0.01% or more employed according to usual practice. Thus it is evident that an economically low consumption of cyanide is made possible.

While zinc is deemed the most efficient precipitant for use in conjunction with the present invention, other metal precipitants have been employed. For example, iron has been used in place of zinc in the precipitation of both precious metals and copper.

The present application is a continuation in part of subject-matter disclosed and claimed in co-pending application Serial No. 704,206, filed December 27, 1933.

We claim:

1. In a process for the precipitation of aqueous cyanide solution containing dissolved metal cyanides, introducing a precipitant into the solution while the solution has a hydrogen ion concentration within the range of pH 6 to 8.4 and while the solution contains carbonic acid.

2. In a process for the precipitation of aqueous cyanide solution containing dissolved metal cyanides, introducing a precipitant into the solution while the solution is substantially neutral and while the solution contains appreciable amounts of ferrous sulphate in free solution.

3. In a process for the precipitation of aqueous cyanide solution containing dissolved metal cyanides, contacting the solution with carbon dioxide gas, and then adding a precipitant to the carbonated solution.

4. In a process for the precipitation of aqueous cyanide solution containing dissolved metal cyanides, contacting the solution with carbon dioxide gas blended with sulphur dioxide, and then adding a precipitant to the carbonated solution.

5. In a process for the precipitation of aqueous cyanide solutions containing dissolved metal cyanides, where the solutions are alkaline in character, conditioning the solution by passing carbon dioxide gas through the same.

6. In a cyanide treatment process for the recovery of metals from ores, contacting the ore with an aqueous solution containing cyanide to an amount sufficient to dissolve the metal but insufficient to enable efficient precipitation by direct contact of the unconditioned pregnant solution with zinc, carbonating the solution, and then adding a precipitant to the carbonated solution to effect precipitation of the desired metal.

7. In a process for the precipitation of aqueous cyanide solution containing dissolved metal cyanides, causing a reaction between the solution and a metallic precipitant, to precipitate the dissolved metals, while the solution has a hydrogen ion concentration between the range of pH 6 to 8.4, and while the solution contains an alkali bisulphite.

8. In a process for the precipitation of aqueous cyanide solution containing dissolved metal cyanides, causing a reaction between the solution and metallic zinc to precipitate the dissolved metals, while the solution has a hydrogen ion concentration within the range of pH 6 to 8.4, and while the solution contains an alkali bisulphite, the alkali-bisulphite serving as a solvent for the zinc and also as an active deoxidizing agent.

9. In a cyanide treatment process for the recovery of metals from ores, contacting the ore with an aqueous solution containing cyanide to an amount sufficient to dissolve the desired metals but insufficient to enable efficient precipitation by direct contact with the unconditioned pregnant solution with metallic zinc, and then causing a reaction between the solution and metallic zinc to precipitate the dissolved metals, while the solution has a hydrogen ion concentration within the range of pH 6 to 8.4, and while the solution contains an alkali bisulphite, the alkali bisulphite serving as a solvent for the zinc and also as an active deoxidizing agent.

10. In a process for the precipitation of aqueous cyanide solution containing dissolved metal cyanides, reacting a metallic precipitant with the solution while the solution is substantially neutral, and while the solution contains chemical capable of activating the metallic precipitant under such conditions of substantial neutrality to promote rapid and efficient precipitation of the dissolved metals, said chemical being from a group comprising the following:—alkali bisulphite, carbonic acid and alkali bicarbonate, and ferrous sulphate.

11. In a process for the precipitation of aqueous cyanide solution containing dissolved precious metal cyanides, reacting a metallic precipitant with the solution while the solution is substantially neutral, and while the solution contains a sulphite salt capable of activating the metallic precipitant under such conditions of substantial neutrality and serving to remove dissolved oxygen.

12. In a process for the precipitation of aqueous cyanide solution containing dissolved metal cyanides, causing a reaction between the solution and metallic zinc to precipitate the dissolved metals, while the solution has a hydrogen ion concentration between the range of pH 6 to 8.4, and while the solution contains chemical from a group comprising the following:—alkali bisulphite, carbonic acid and alkali bicarbonate, and ferrous sulphate.

LOUIS D. MILLS.
THOMAS B. CROWE.
JOYE C. HAUN.